United States Patent
Kholaif

(10) Patent No.: US 8,837,513 B2
(45) Date of Patent: Sep. 16, 2014

(54) SCHEDULING AND POWER SAVING WITH UNSCHEDULED SERVICE PERIODS IN A WIRELESS SYSTEM

(75) Inventor: Ahmad Mohammad Mohammad Kholaif, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 200 days.

(21) Appl. No.: 13/602,391

(22) Filed: Sep. 4, 2012

(65) Prior Publication Data

US 2013/0058268 A1 Mar. 7, 2013

Related U.S. Application Data

(60) Provisional application No. 61/531,797, filed on Sep. 7, 2011.

(51) Int. Cl.
*H04L 12/413* (2006.01)
*H04W 74/08* (2009.01)

(52) U.S. Cl.
CPC ............ *H04W 74/085* (2013.01); *Y02B 60/50* (2013.01)
USPC ...................................................... 370/445

(58) Field of Classification Search
None
See application file for complete search history.

(56) References Cited

U.S. PATENT DOCUMENTS

| | | | |
|---|---|---|---|
| 5,940,771 A | 8/1999 | Gollnick et al. | |
| 6,262,980 B1 | 7/2001 | Leung et al. | |
| 7,031,274 B2 | 4/2006 | Sherman | |
| 7,436,790 B2 | 10/2008 | Todd et al. | |
| 7,460,501 B2 | 12/2008 | Sherman | |
| 7,477,616 B2 | 1/2009 | Wang et al. | |
| 7,936,709 B2 * | 5/2011 | Bhatti et al. | 370/326 |
| 8,194,695 B2 * | 6/2012 | Kim et al. | 370/448 |
| 8,570,986 B2 * | 10/2013 | He et al. | 370/336 |
| 2003/0161279 A1 | 8/2003 | Sherman | |
| 2004/0023679 A1 | 2/2004 | Shoobridge | |
| 2004/0253996 A1 | 12/2004 | Chen et al. | |
| 2004/0264423 A1 * | 12/2004 | Ginzburg et al. | 370/338 |
| 2005/0002420 A1 | 1/2005 | Jeanne et al. | |
| 2005/0025081 A1 | 2/2005 | Wakamatsu | |
| 2005/0025176 A1 * | 2/2005 | Ko et al. | 370/448 |

(Continued)

OTHER PUBLICATIONS

Carlson, Emma et al., "Distributed allocation of time slots for real-time traffic in a wireless multi-hop network", Feb. 2004.

(Continued)

*Primary Examiner* — Brian Roberts
(74) *Attorney, Agent, or Firm* — Integral Intellectual Property Inc.; Miriam Paton

(57) ABSTRACT

A wireless client device associated with an access point records at which time T after a transmission time of a most recent beacon frame it gained access to the wireless medium for transmission of an uplink packet to the access point. The wireless client device self-schedules target transmission times for one or more future uplink packets, where each of the target transmission times is T after a respective expected transmission time of a beacon frame. Rather than immediately attempting to gain access to the wireless medium when it determines that another uplink packet is ready for transmission, the wireless client device waits until shortly before its next upcoming target transmission time to make the attempt. Implementation in wireless client devices that are attempting to transmit uplink packets to the same access point may prolong the amount of time they can remain in a doze state, potentially reducing their power consumption.

20 Claims, 8 Drawing Sheets

(56) References Cited

U.S. PATENT DOCUMENTS

| | | | |
|---|---|---|---|
| 2005/0047357 A1 | 3/2005 | Benveniste | |
| 2005/0122935 A1 | 6/2005 | Mangin et al. | |
| 2005/0122999 A1 | 6/2005 | Scherzer et al. | |
| 2005/0254444 A1 | 11/2005 | Meier et al. | |
| 2006/0009229 A1 | 1/2006 | Yuan et al. | |
| 2006/0087974 A1 | 4/2006 | Ozer et al. | |
| 2006/0171341 A1 | 8/2006 | Wang | |
| 2006/0218229 A1 | 9/2006 | Pandey et al. | |
| 2008/0298290 A1* | 12/2008 | Wentink | 370/311 |
| 2010/0135256 A1* | 6/2010 | Lee et al. | 370/336 |
| 2010/0202354 A1 | 8/2010 | Ho | |
| 2010/0309872 A1* | 12/2010 | Amini et al. | 370/329 |

OTHER PUBLICATIONS

Chen, Jyh-Cheng et al., "A comparison of MAC protocols for wireless local networks based on battery power consumption", 1998.

Foud, Hicham B., Final Office Action for U.S. Appl. No. 11/464,535, Jan. 29, 2010.

Foud, Hicham B., First Non-Final Office Action for U.S. Appl. No. 11/464,535, Feb. 18, 2009.

Foud, Hicham B., Second Office Action for U.S. Appl. No. 11/464,535, Sep. 4, 2009.

Tseng, Yu-Chee et al., "Power-saving protocols for IEEE 802.11-based multi-hop ad hoc networks", 2002.

Woesner, Hagen et al., "Power-saving mechanisms in emerging standards for wireless LANs: the MAC level perspective", 1998.

Xiao, Yang et al., "On Optimizing Backoff Counter Reservation and Classifying Stations for the IEEE 802.11 Distributed Wireless LANs", Jul. 2006.

Barcelo, Jaume et al., Fairness and convergence of CSMA with Enhanced Collision Avoidance (ECA) IEEE International Conference on Communications (ICC) 2010, pp. 1-6, May 27, 2010, Digital Object Identifier: 10.1109/ICC.2010.5502705 May 27, 2010.

Chassatte, Remy, Extended European Search Report for EP12182992, Oct. 30, 2013.

Cionca, Victor et al., Learning, Self-Scheduling TDMA (LeSS-TDMA) for Wireless Sensor Networks Aug. 28, 2008, 169-175.

Shi, Minghui, First Office Action for CA2,788,507, Oct. 21, 2013.

* cited by examiner

SCHEDULING AND POWER SAVING WITH UNSCHEDULED SERVICE PERIODS IN A WIRELESS SYSTEM

CROSS-REFERENCE TO PREVIOUS APPLICATIONS

This application claims the benefit under 35 U.S.C. 119(e) to U.S. Provisional Application No. 61/531,797 filed Sep. 7, 2011, entitled "Scheduling and Power Saving with Unscheduled Service Periods in a Wireless System", the contents of which are incorporated by reference herein in their entirety.

TECHNICAL FIELD

The technology described herein generally relates to wireless local area networks (WLANs), and more particularly, to time management and power saving for one or more mobile stations (STAs) (also known as wireless client devices) in a WLAN.

BACKGROUND

In a basic service set (BSS), STAs may communicate with an access point (AP) over a common communication channel of a wireless medium. Only one STA is able to communicate with the AP at a time. To avoid collisions, STAs may use a technique called Carrier Sense Multiple Access with Collision Avoidance (CSMA/CA) to sense whether the wireless medium is idle before attempting to transmit to the AP. When more than one STA seeks to transmit to the AP at the same time, the STAs may go through a contention process for access to the wireless medium. Once a STA wins the contention and gains access to the wireless medium, it may transmit to the AP.

A STA may support a power-save mode in which the STA enters an awake state when it has an uplink packet to send (or downlink packet to receive) and then switches to a doze state when transmission of the packet is complete. In the awake state, the STA may be fully powered. In the doze state, the STA may consume very low power and may not be able to transmit or receive.

BRIEF DESCRIPTION OF THE DRAWINGS

The figures of the accompanying drawings are intended to illustrate by way of example and not limitation. Like reference numbers in the figures indicate corresponding, analogous or similar elements.

DETAILED DESCRIPTION

Figure 1:
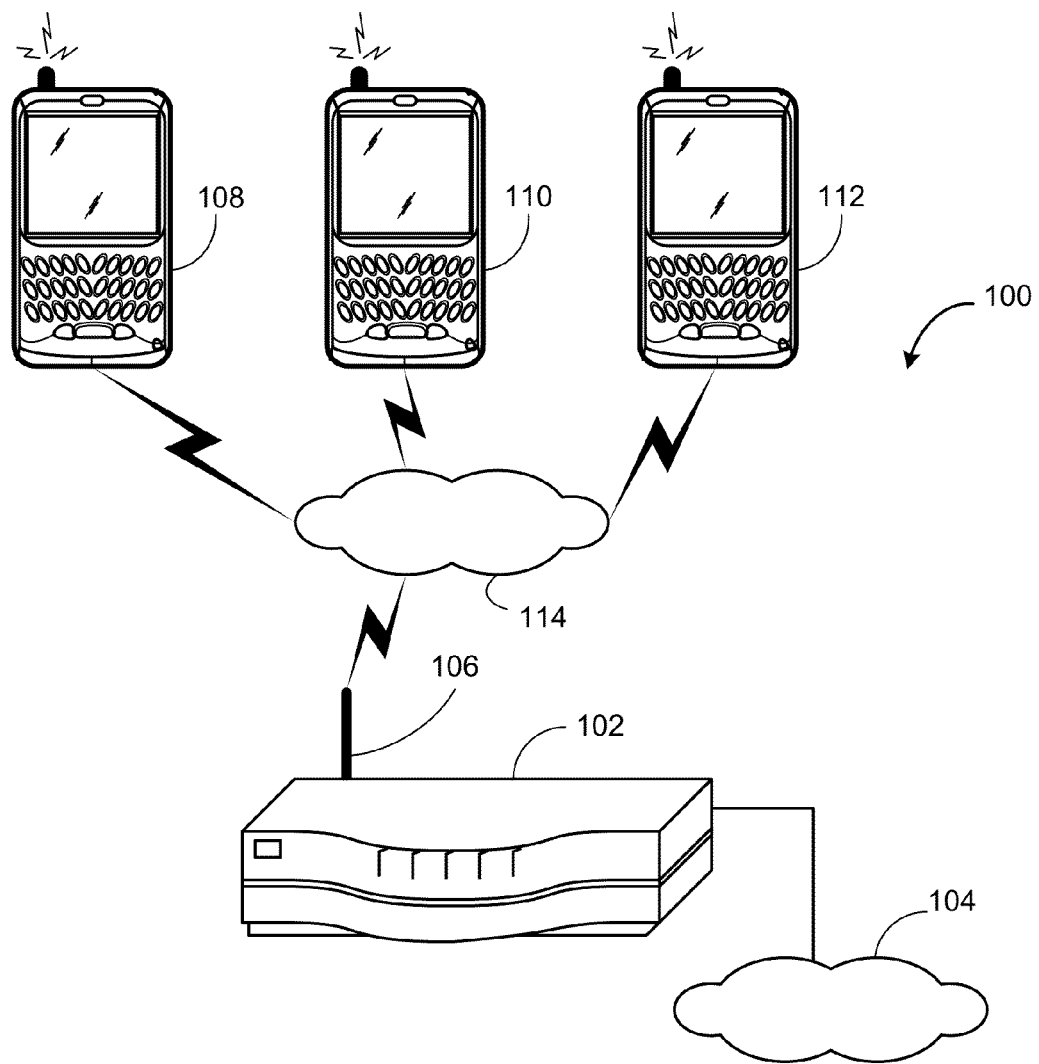
FIG. 1 is an illustration of an example communications system including a wireless access point and three STAs.

This description uses terminology associated with the family of IEEE 802.11 standards defined by the Institute of Electrical and Electronic Engineers (IEEE) for Wireless Local Area Network (LAN) Medium Access Control (MAC) and Physical layer (PHY) specifications. However, it will be obvious to a person of ordinary skill in the art how to modify the techniques described herein to any wireless local area network and its components.

Mobile stations (STAs) may compete for access to a wireless medium using Carrier Sense Multiple Access with Collision Avoidance (CSMA/CA) techniques. Waiting idle in an awake state for an opportunity to seize the medium is a power-consuming activity for a STA. The problem of power consumption by STAs competing for access to the wireless medium is exacerbated when the AP with which the STAs are associated restricts the time available to the STAs for transmissions. Such restrictions will occur, for example, if the AP is part of a WLAN mesh network and therefore has to reserve some of its time for backhaul relaying of traffic to other APs. Such restrictions will also occur, for example, if the AP implements power-saving techniques that require the AP to enter a power-save mode or other state in which it reduces its availability to communicate with STAs. The AP may itself be a STA that implements power-saving techniques, as is the case for STAs participating in WLAN peer-to-peer technology, such as Group Owners (GO) in Wi-Fi Direct™.

A framework is proposed herein in which a STA associated with an AP in a BSS notes at which time it successfully seized the wireless medium for transmission to the AP and attempts to transmit future transmissions at that same time in the future, relative to some reference event common to other STAs in the BSS. If other STAs communicating with the same AP as the STA mentioned above implement the same framework, then the STAs jointly effect a quasi/pseudo time-division multiple access technique for accessing the wireless medium, in which each STA attempts to access the wireless medium at a different time. Since a STA expects to seize the wireless medium at approximately the same time as a previous successful seizing of the wireless medium, the STA can remain in the doze state prior to that time and enter the awake state shortly before its time to transmit.

This framework may be particularly suitable in a system in which STAs are generating at fixed time intervals packets of fixed length for transmission over the wireless medium. Such a situation occurs in a STA with voice over IP (VoIP) applications. This framework may also be suitable in a system in which STAs are generating at fixed time intervals packets of variable length for transmission over the wireless medium, such as videoconferencing applications.

Implementation of this framework may reduce the amount of time that STAs are waiting idle in an awake state for an opportunity to seize the wireless medium, thus reducing the power consumption of the STAs. Implementation of this framework may result in more time available for packet transmissions. This additional time for packet transmissions may enable one or more of the following: an increase in network capacity, higher throughput, and the use of power saving techniques in the associated AP.

FIG. 1 is an illustration of an example communications system 100. System 100 is an example of a basic service set (BSS). System 100 includes a wireless access point (AP) 102 coupled to a network 104, possibly through a wired communication interface, a satellite interface, a Worldwide Interoperability for Microwave Access (WiMAX®) communication interface, or any other suitable communication interface. AP 102 has at least one antenna 106.

System 100 includes mobile stations or STAs (also known as wireless client devices) 108, 110, and 112, each associated with AP 102 over a common wireless communication channel of wireless medium 114. A non-exhaustive list of examples for any of STAs 108, 110 and 112 includes a laptop computer, a notebook computer, an electronic reader, a cellphone, a smartphone, a personal digital assistance (PDA), a digital video camera, a digital still camera, a gaming console, an Internet Protocol (IP) phone, and a tablet computer, a digital music player.

Communication between STAs 108, 110, and 112 and AP 102 is limited by the fact that only one transmission can be made over the common wireless communication channel at a time. For example, if STA 108 and STA 110 attempt to transmit to AP 102 at the same time, the attempt may result in a collision and, consequently, a loss of information. It is desirable to avoid such collisions.

IEEE Std. 802.11™-2012 published Mar. 29, 2012 by IEEE Computer Society, hereinafter "IEEE Std. 802.11™-2012", explains that APs transmit a type of management frame denoted a "beacon" frame at substantially regular time intervals. The format of beacon frames and their contents are explained in detail in IEEE Std. 802.11™-2012 standard. The number of time units between target beacon transmission times (TBTTs) is referred to as a beacon interval. The beacon interval is included in each beacon frame. Each beacon frame also includes a timestamp which is the value of a clock internal to the AP at the actual beacon transmission time (BTT). A STA receiving the beacon frame will update its internal clock according to the timestamp in the received beacon frame. Occasionally a BTT may be delayed from its TBTT.

Figure 2:
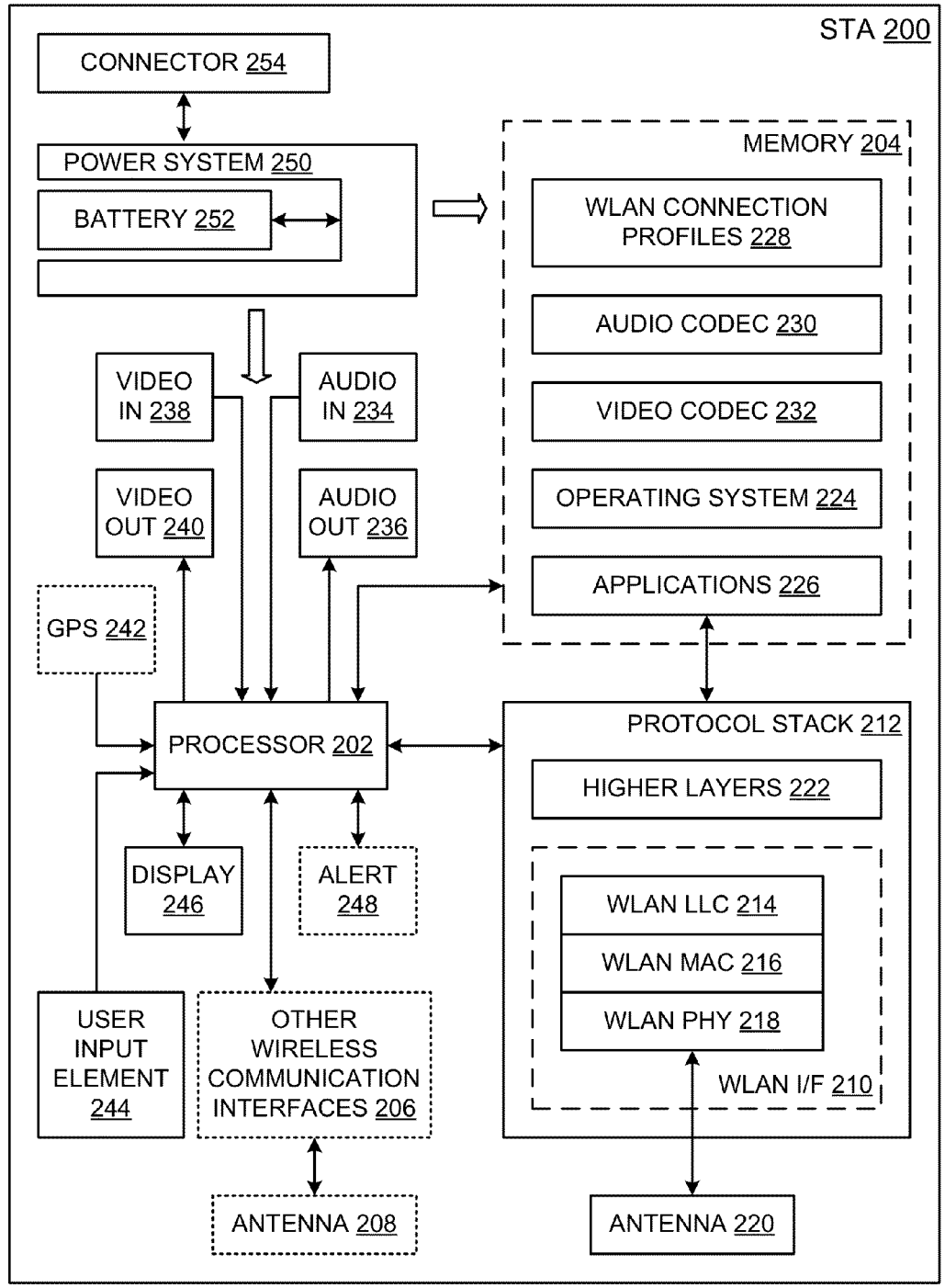
FIG. 2 is a simplified block diagram of an example STA.

FIG. 2 is a simplified block diagram of an example STA 200. STA 108, STA 110, and STA 112 are examples of STA 200. STA 200 comprises a processor 202 coupled to a memory 204 and optionally to one or more other wireless communication interfaces 206. For example, other wireless communication interfaces 206 may comprise a short-range wireless communication interface such as a wireless personal area network interface, possibly compatible with Bluetooth®. In another example, other wireless communication interfaces 206 may comprise a wireless wide area network (WWAN) interface such as for cellular communications. One or more antennas 208 may be coupled to respective ones of the other wireless communication interfaces 206. An antenna may be shared among more than one wireless communication interface.

STA 200 also comprises a WLAN interface 210 within a protocol stack 212 that is coupled to processor 202. WLAN interface 210 comprises a WLAN LLC module 214, a WLAN MAC module 216 and a WLAN PHY module 218. WLAN MAC module 214 may be compatible with one or more standards of the family of IEEE 802.11 wireless communication standards (as described in IEEE Std. 802.11™-2012) or future related standards. STA 200 also comprises an antenna 220 coupled to WLAN PHY module 218. Protocol stack 212 may comprise higher layers 222. STA 200 is able to communicate with a WLAN access point, for example, AP 102, using WLAN interface 210.

Memory 204 may store an operating system 224 to be executed by processor 202. Memory 204 may store applications 226 installed in STA 200 to be executed by processor 202. Memory 204 may also store data (not shown) used by operating system 224 and applications 226.

Memory 204 may store one or more WLAN connection profiles 228, each identifying a wireless local area network by its network name.

Memory 204 may store an audio coder-decoder (codec) 230 or a video codec 232 or both. A non-exhaustive list of examples for audio codec 230 includes G.711, G.722, G.723, G.726, G.729, MP3, Windows® Media Audio (WMA), Vector Sum Excited Linear Prediction (VSELP), Digital Speech Standard (DSS), and any other suitable audio codec. A non-exhaustive list of examples for video codec 232 includes H.261, H.263, H.264, flavors of Moving Picture Experts Group (MPEG), RealVideo®, Windows® Media Video, DivX®, Pixlet®, and any other suitable video codec.

STA 200 may comprise an audio input element 234 and an audio output element 236, both coupled to processor 202. STA 200 may comprise a video input element 238 and a video output element 240, both coupled to processor 202.

For example, applications 226 may comprise a VoIP application that works together with audio input element 234, audio output element 236, and audio codec 230. In another example, applications 226 may comprise a videoconferencing application that works together with audio input element 234, audio output element 236, audio codec 230, video input element 238, video output element 240, and video codec 232.

STA 200 may optionally comprise a Global Positioning System (GPS) module 242 coupled to processor 202.

STA 200 may comprise one or more user input elements 244 coupled to processor 202. Examples of user input elements include a keyboard, a keypad, a touchscreen, a joystick, a thumbwheel, a roller, a touchpad, an optical pad, and the like.

STA 200 may comprise one or more user output elements coupled to processor 202, of which a display 246 is illustrated. In the event that display 246 is a touchscreen, it functions also as a user input element.

STA 200 may optionally comprise one or more alert components 248 coupled to processor 202, to be activated in order to alert a user, for example, by sounding a buzzer, playing a ringtone, or vibrating.

STA 200 comprises a power system 250, one or more batteries 252 coupled to power system 250, and a connector 254 coupled to power system 250. Connector 254 is connectable to an external power source (not shown) to provide power for charging batteries 252 or for operating STA 200 or for both. Power system 250 provides electrical coupling between the external power source and batteries 252, and provides electrical coupling between batteries 252 and the electrical components of STA 200 (e.g. processor 202, memory 204, and the like). As part of the electrical coupling between the external power source and batteries 252, power system 250 may control the charging of batteries 252 with electrical charge drawn from the external power source.

STA 200 may comprise other elements that, for clarity, are not illustrated in FIG. 2. Similarly, STA 200 may comprise a subset of the elements illustrated in FIG. 2.

Various mechanisms for power saving in STAs are provided in IEEE Std. 802.11™-2012 and in variations thereof. Future related 11 standards or variations thereof or both will likely provide additional or alternate power-saving mechanisms for STAs.

Power saving mechanisms for STAs are defined in IEEE Std. 802.11™-2012 standard. For example, a STA operating in the power-save mode, upon determining that data destined for the STA is currently buffered in the AP, transmits a short PS-poll frame to the AP, which either responds immediately with the corresponding buffered data or responds immediately with an acknowledgement of the PS-poll frame and transmits the corresponding buffered data at a later time.

In wireless local area networks supporting Quality of Service (QoS) facility, as published in IEEE Std. 802.11™-2012, a STA may use unscheduled automatic power save delivery (U-APSD) as part of its power management. Under U-APSD, a STA in power save mode enters the awake state to send uplink packets (and receive downlink packets) and then immediately enters the doze state in order to save battery life. Examples of uplink packets include trigger frames (for example, QoS-Data or QoS-NULL Data) to initiate data exchange with the AP for an access category that supports triggering, data packets (for example, background packets, best effort packets, voice packets, or video packets), or any other suitable uplink packets. Returning to example system 100 illustrated in FIG. 1, STA 108 may have one or more uplink packets in queue for transmission to AP 102. STA 110 may also have one or more uplink packets in queue for transmission to AP 102. If STA 108 and STA 110 both attempt to access wireless medium 114 at approximately the same time, STA 108 and STA 110 will compete for access to wireless medium 114 according to a CSMA/CA mechanism. Any CSMA/CA mechanism known in the art or future CSMA/CA mechanism is suitable.

The situation in which more than one STA attempts to gain access to the wireless medium at the same time is common. As described above, an AP may restrict the time available to STAs for transmissions. Such restrictions will occur, for example, if the AP is part of a WLAN mesh network and therefore has to reserve some of its time for relaying data over WLAN relay links. Such restrictions will also occur, for example, if the AP implements power-saving techniques that require the AP to enter a power-save mode or other state in which it reduces its availability to communicate with STAs. The AP will likely inform the STAs of its availability, for example, by communicating an indication of its availability in a beacon frame. In one example, the AP may communicate an indication of its availability in a Network Allocation Map (NAM), which is an information element of a beacon frame. In another example, the AP may communicate an indication of its lack of availability in a Notice of Absence frame. In the case that the AP communicates indications of its availability in frames other than beacon frames, the STAs may enter an awake state in anticipation of these frames. If multiple STAs have uplink packets which they are waiting to transmit to the AP, they may all attempt to gain access to the wireless medium at the start of an availability period that has been communicated to the STAs by the AP. This may lead to a contention process where each STA that does not gain access to the wireless medium on its first attempt must wait idle for some random backoff interval before attempting to gain access again.

Returning to FIG. 1, until STA 108 gains access to the wireless medium and successfully transmits its uplink packet to AP 102, its radio will remain in the awake state, drawing power from the batteries. Only after STA 108 has successfully transmitted its packet may it return to the doze state. Similarly, STA 110 may only return to the doze state once it gains access to the wireless medium and successfully transmits its packet to AP 102. Consider now that STA 108 and STA 110 are each in a voice communication session. Voice codecs generate packets periodically at predefined intervals. Therefore, if STA 108 and STA 110 are using codecs that generate packets at the same rate, they may need to contend for access to wireless medium 114 for every new packet they generate. For example, for a G.711 codec, this would mean contending every 20 ms. Consider now the case that STA 112 also requires access to wireless medium 114 to send voice packets generated by a G.711 codec. If STA 112 attempts to access wireless medium 114 at approximately the same time as STA 108 and STA 110, then there are now three STAs (108, 110, and 112) contending for access to wireless medium 114 every 20 ms. With more STAs contending for access, the average STA waiting time before successful transmission of a voice packet will increase, leading to an increase in STA power consumption.

If all the STAs in a BSS would share the wireless medium by taking turns in an organized fashion, the risk of contention between STAs and consequently the power consumed by waiting idle in the awake state while other STAs communicate with the AP might be reduced. As proposed herein, this sharing of the wireless medium may be realized by each STA in a BSS self-scheduling future uplink packet transmission times based on previously successful uplink packet transmission times.

For simplicity, unless otherwise indicated, it will be assumed in the following examples that an AP is always active, such that it is available to communicate with a STA at any point between beacon frames.

Figure 3:
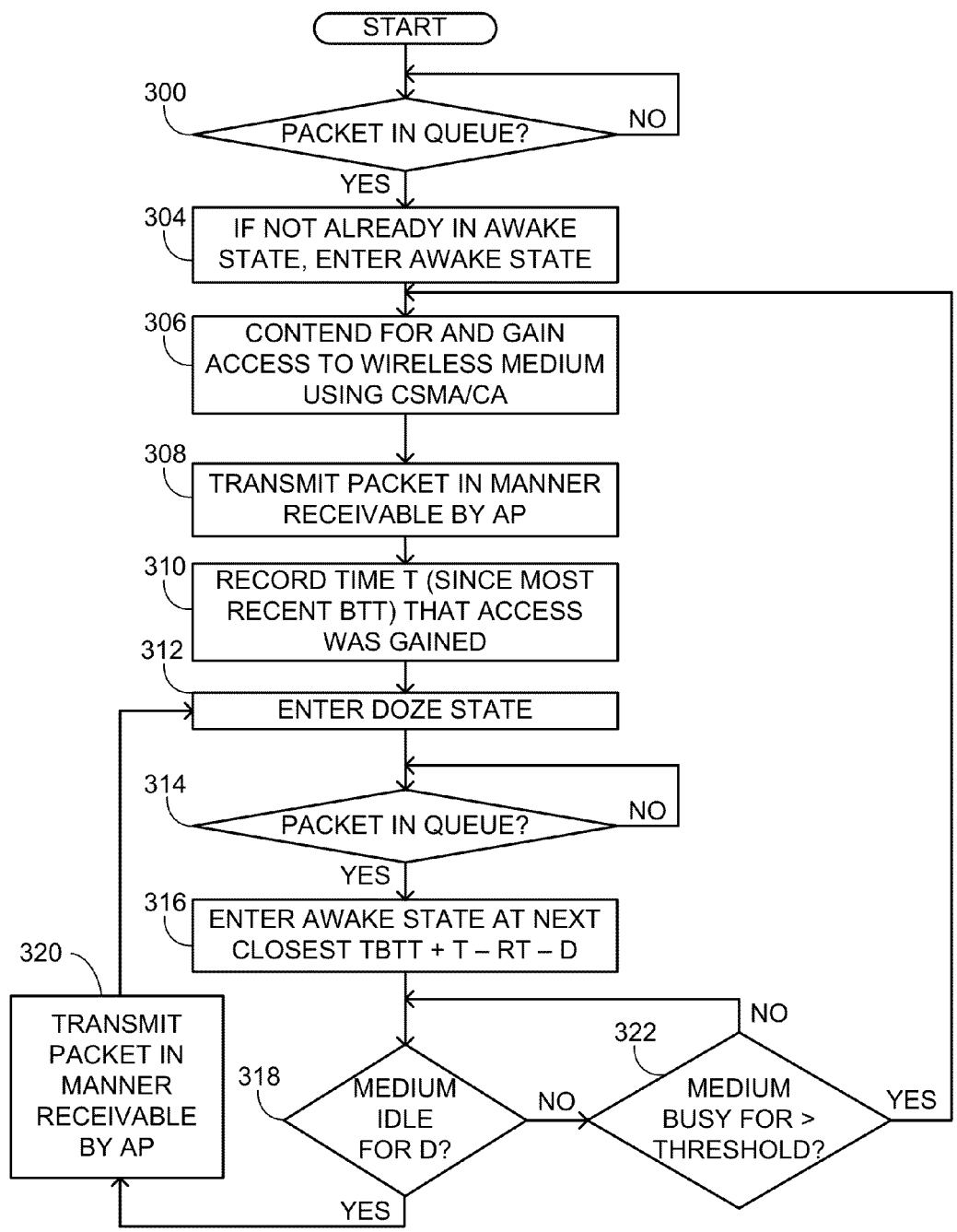
FIG. 3 is a flowchart of a first example method in a STA for power saving and scheduling a single uplink transmission time within a beacon interval.
Figure 4:
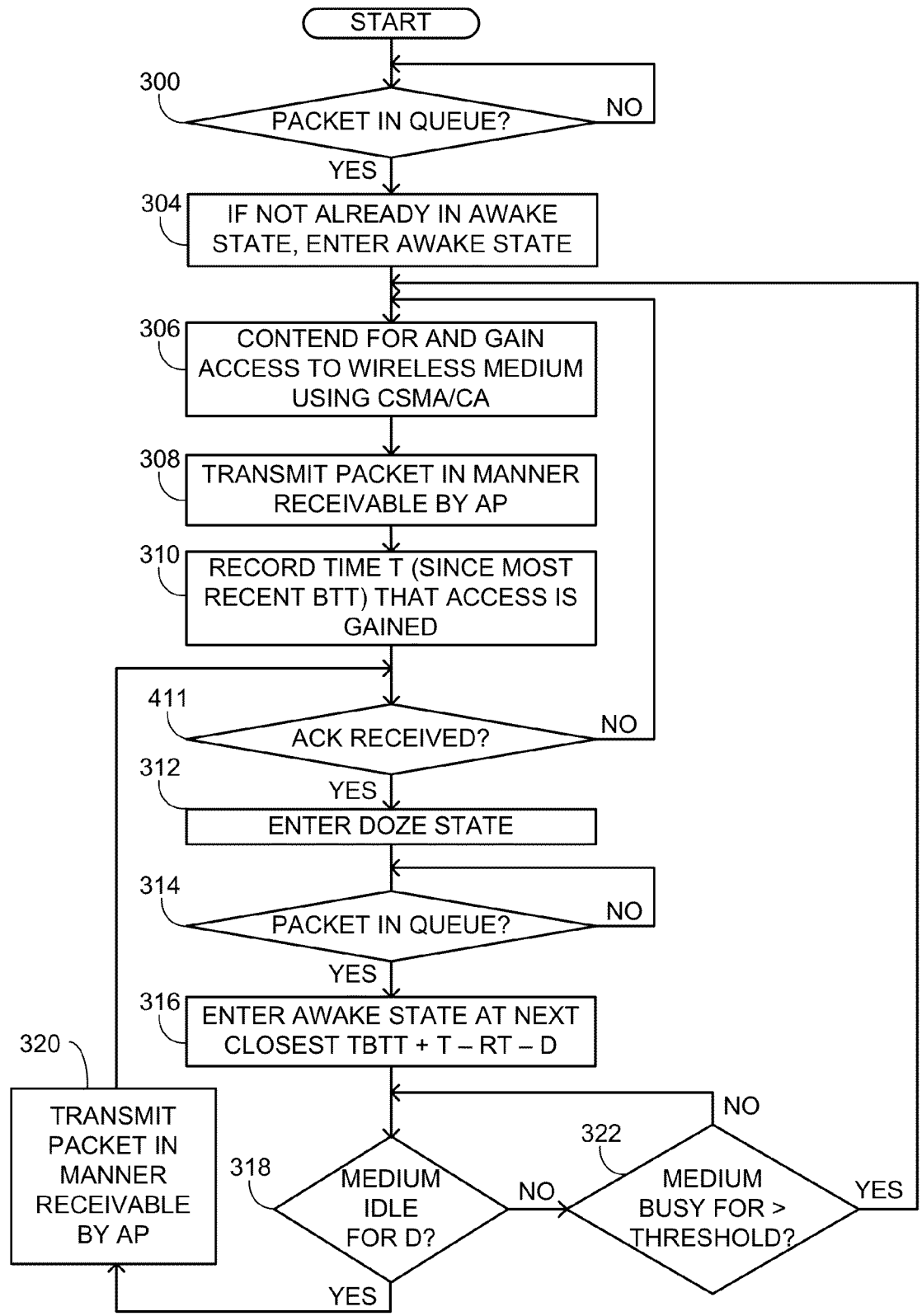
FIG. 4 is a flowchart of a second example method in a STA for power saving and scheduling a single uplink transmission time within a beacon interval.

FIG. 3 is a flowchart of an example method in a STA for power saving and scheduling a single uplink packet transmission time within a beacon interval. At 300, a power saving STA checks whether it has an uplink packet in its transmission queue that is ready to be transmitted to the AP with which the STA is associated. Once the STA determines at 300 that it has an uplink packet in its transmission queue that is ready to be transmitted to the AP with which the STA is associated, the STA proceeds to 304 where, if the STA is not already in an awake state, the STA enters an awake state. At 306, the STA uses a CSMA/CA mechanism to contend for and gain access to the wireless medium. While not explicitly shown, reservation of the wireless medium using request to send (RTS) and clear to send (CTS) frames, described in detail in IEEE Std. 802.11™-2012 standard, is also contemplated when required to address the hidden node problem. The STA may gain access to the wireless medium at a time T after the most recent beacon transmission time (BTT). At 308, the STA transmits the queued uplink packet in a manner receivable by the AP. Although not explicitly shown, the STA may use Carrier Sense (CS) to sense that the wireless medium is idle for a specific period of time prior to transmitting the packet. This time may be included in time T. In this example, the STA assumes that the uplink packet was successfully received by the AP. However, variations of this method are contemplated. For example, the use of an acknowledgement (ACK) frame as confirmation of the successful receipt of an uplink packet by the AP is shown in FIG. 4. The use of ACK frames is described in detail in IEEE Std. 802.11™-2012 standard. At 310, the STA records the time T (since the most recent BTT) that access to the wireless medium was gained. This time T is used to define a target transmission time, which will be used to self-schedule the transmission of future uplink packets. At 312, the STA enters the doze state. At 314, the STA checks if there is a second uplink packet in its transmission queue. If the STA determines that there is a second packet, the STA remains in the doze state as it waits for the next target transmission time. In the examples herein, once the target transmission time has been defined based on a successful transmission at BTT+T, future transmission times are self-scheduled relative to the closest preceding target beacon transmission time (TBTT), such that packets in subsequent beacon intervals are transmitted at TBTT+T. The strategy of self-scheduling future uplink transmissions at TBTT+T instead of BTT+T will be discussed in more detail with reference to FIG. 5.

Returning to FIG. 3, at 316, the STA enters the awake state in anticipation of time TBTT+T. This process of entering the awake state in anticipation of the next closest target transmission time may be repeated for each new uplink packet that is generated. It should be noted that the STA may awake at a specific time prior to time TBTT+T, for example, to allow for power "ramp-up" and to allow for the STA to sense the state of the wireless medium using CS for a specific amount of time prior to transmitting. The amount of time that the STA senses the state of the wireless medium may be a fixed amount or may be dependent upon the particular access category, as described in IEEE Std. 802.11™-2012. For the purposes of the examples herein, the power "ramp-up" time will be denoted RT and the delay time for the STA to sense the state of the wireless medium will be denoted D. Therefore, at 316 the STA will enter the awake state at time TBTT+T−RT−D.

If the STA determines at 318 that the wireless medium has remained idle throughout delay D, the STA skips the contention process altogether, proceeds to 320 where it transmits its second uplink packet in a manner receivable by the AP and returns to the doze state at 312. Again, once the STA determines at 314 that there is another packet in its transmission queue, it will remain in the doze state and wait for the next target transmission time.

If the STA determines at 318 that the wireless medium becomes busy during delay D, the STA may proceed to determine for how long the medium remains busy. The amount of time the wireless medium remains busy may be compared to a threshold time at 322 in order to determine whether the STA should proceed to re-contend for the wireless medium at 306 or check again at 318 if the wireless medium is idle for delay D. The threshold time may be any suitable value. For example, the threshold time may be determined based on the STA's own average packet transmission time or some fraction of the average packet transmission time. If the STA determines at 322 that the wireless medium is not busy for more than the threshold time, the STA may return to 318 and again check that the wireless medium remains idle throughout delay D. If the STA determines at 322 that the wireless medium is busy for longer than the threshold time, the STA may proceed to 306 and again contend for and gain access to the wireless medium using CSMA/CA. In this case, the previously recorded time T may be deemed unsuitable for self-scheduling of future uplink transmissions and the STA may record a new time T at 310 to replace the previously recorded time T. Alternatively, although not explicitly illustrated in FIG. 3, the STA may not replace the previously recorded time T even if the wireless medium is busy for longer than the threshold time. For example, the STA may only replace a previously recorded time T with a new time T if the number of times the wireless medium is busy for longer than the threshold time exceeds some maximum number of times.

In a BSS where all STAs are self-scheduled to transmit only at their respective target transmission times relative to a common reference (TBTT), there is a very high likelihood that if the wireless medium was available to a particular STA at time T relative to a previous TBTT, then the wireless medium will also be available to that STA at time T relative to the most recent TBTT. Consider, for example, a situation where multiple STAs associated with an AP are seeking access to the wireless medium to transmit their uplink packets and all STAs are following the method illustrated in FIG. 3.

Initially, each STA may need to contend with the other STAs for access to the wireless medium in order to transmit its first uplink packet. Eventually, each STA will successfully transmit its first packet and record the time T after the most recent BTT (which is a common reference to all STAs associated with the same AP) that it gained access to the wireless medium. Now, for subsequent packets, each STA can be reasonably assured that it will be able to successfully transmit a packet at its recorded target transmission time T after the most recent TBTT (which is also a common reference to all STAs). By waiting in anticipation of its target transmission time before entering the awake state (see 316 in FIG. 3), a STA may only need to be in the awake state from TBTT+T−RT−D until the end of the uplink packet transmission. In contrast, if a STA behaves according to traditional methods to access the wireless medium, it may enter the awake state immediately upon determining it has a packet ready for transmission and thereby risk losing a contention with other STAs for access to the wireless medium, which may result in the STA having to remain idle in the awake state while it waits for other transmissions to finish and for one or more random backoff intervals. This additional time that the STA is idle in the awake state increases its power consumption. In contrast, by each STA delaying its transmission of an uplink packet until its self-scheduled target transmission time, each STA reduces the amount of time it needs to remain in the awake state, thereby reducing its power consumption. Although not shown in the simplified flowchart of FIG. 3, it will be obvious to a person of ordinary skill in the art that the STA may enter the awake state at any time to receive downlink packets. For example, the STA may enter the awake state in anticipation of a beacon frame.

FIG. 4 is a flowchart of another example method in a STA for power saving and scheduling a single uplink packet transmission time within a beacon interval. The method illustrated in FIG. 4 is similar to that illustrated in FIG. 3, but includes details of the use of an ACK frame in confirming receipt of an uplink packet transmitted from the STA to the AP. Those portions of the method illustrated in FIG. 4 that are identical to that illustrated in FIG. 3 are labeled with the same reference numerals and are not described for a second time. Following transmission at 308 of the first queued uplink packet in a manner receivable by the AP and recordation of time T at 310, the STA checks at 411 if an ACK frame was received from the AP in response to the transmission of the uplink packet. If an ACK frame was not received, the STA may determine that the uplink packet was not successfully transmitted to the AP, and may return to 306 to contend for access to the wireless medium again. This may occur, for example, in non-time sensitive applications where non-acknowledged packets, such as non-acknowledged data packets, are to be re-transmitted by the STA.

If the STA does determine at 411 that it has received an ACK frame from the AP, the STA may determine that the uplink packet was successfully received by the AP and may enter the doze state at 312.

Although not explicitly shown in FIG. 4, it is also contemplated that, even if the STA does not determine at 411 that an ACK frame has been received, the STA may still enter the doze state at 312. This may occur, for example, in time-sensitive applications where packets that have collided are generally not re-transmitted, for example, voice packets.

In another example, the STA may enter the doze state at 312 as long as the number of expected ACK frames that have not been received by the STA does not exceed some maximum number, for example, N. In this case, if the STA determines that it has not received an ACK frame in response to the transmission of the last N+1 packets, the STA may proceed to re-contend for access to the wireless medium at 306.

Skipping ahead to the portion of the method where the STA has entered the awake state in order to transmit a second uplink packet, if the STA determines at 318 that the wireless medium has remained idle throughout delay D, the STA skips the contention process altogether, and proceeds to transmit its second uplink packet at 320 in a manner receivable by the AP. Again, the STA checks at 411 if an ACK frame was received from the AP. If an ACK frame was not received, the STA may determine that the uplink packet was not successfully transmitted to the AP, and may return to 306 to contend for access to the wireless medium again. If the STA does determined at 411 that it has received an ACK frame, the STA may determine that the uplink packet was successfully received by the AP and may enter the doze state at 312. Alternatively, even if the STA does not receive an ACK frame, the STA may still enter the doze state at 312, as discussed previously.

Assuming that the STA waits for receipt of an ACK frame prior to entering the doze state at 312 and that the ACK frame is received, transmission of the second uplink packet according to the method of FIG. 4 may only require the STA to be awake from TBTT+T−RT−D until receipt of the ACK frame.

If the STA determines at 318 that the wireless medium has become busy during delay D, the STA may proceed to determine for how long the medium remains busy. If the STA determines at 322 that the wireless medium is not busy for more than a threshold time, as discussed with respect to FIG. 3, the STA may return to 318 and again check that the wireless medium remains idle throughout delay D. If the STA determines at 322 that the wireless medium is busy for longer than the threshold time, the STA may proceed to 306 and again contend for and gain access to the wireless medium using CSMA/CA, as discussed previously with respect to FIG. 3. Following transmission of the packet at 308, the STA may record a new time T at 310 to replace the previously recorded time T. Alternatively, although not explicitly illustrated in FIG. 4, the STA may not replace the previously recorded time T even if the wireless medium is busy for longer than the threshold time. For example, the STA may only replace a previously recorded time T with a new time T if the number of times the wireless medium is busy for longer than the threshold time exceeds some maximum number of times.

As with the method illustrated in FIG. 3, it will be obvious to a person of ordinary skill in the art that the STA may enter the awake state at any time to receive downlink packets, such as beacon frames.

Figure 5:
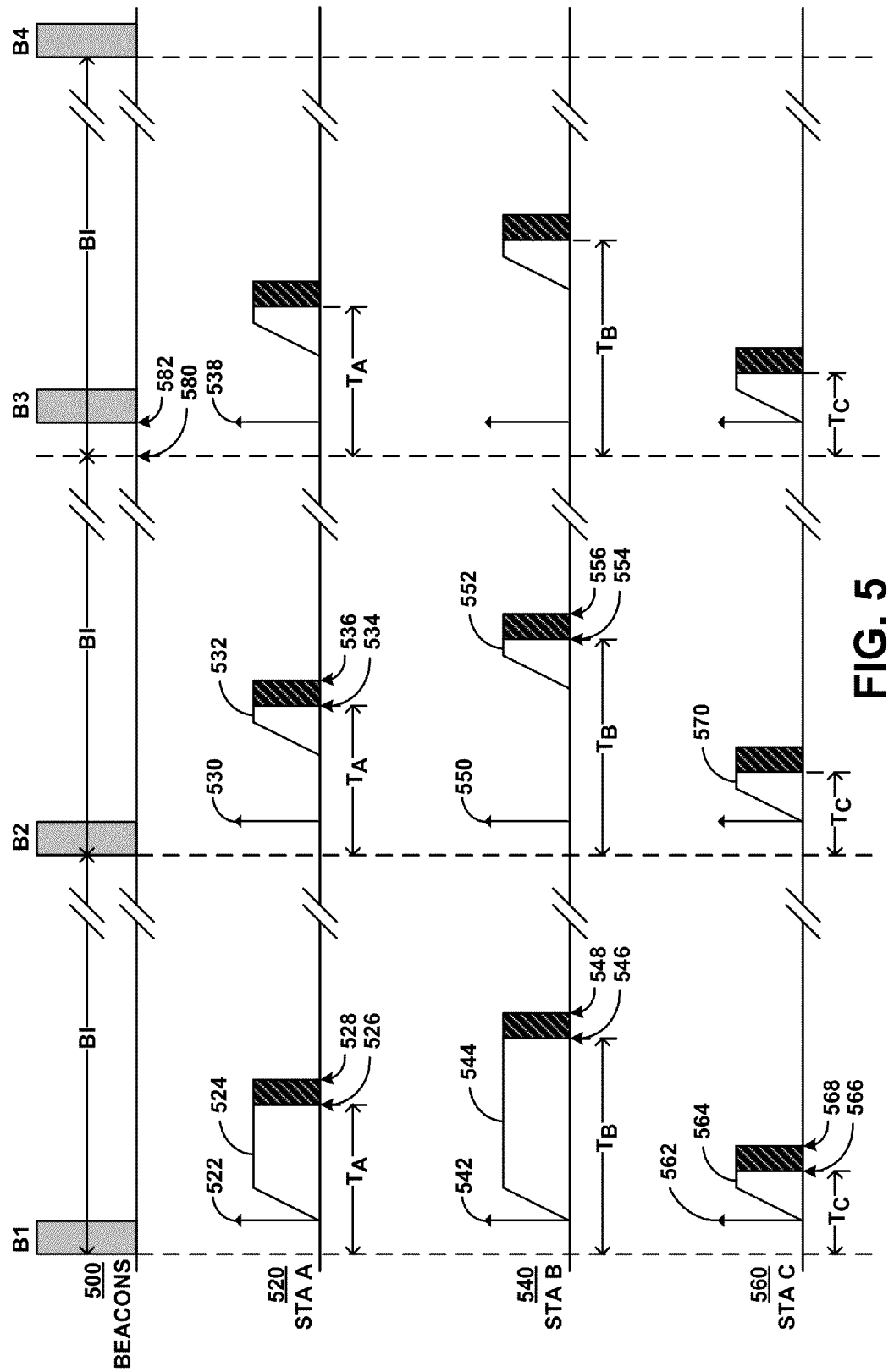
FIG. 5 is a simplified timing diagram of example events in a BSS comprising three STAs and an AP, where each STA is implementing either the method of FIG. 3 or the method of FIG. 4.

FIG. 5 is a simplified timing diagram of example events in a BSS comprising an AP and three wireless client devices (STA A, STA B, and STA C), where each STA is implementing the method illustrated in FIG. 3 (or FIG. 4). STA A, STA B, and STA C are examples of STAs 108, 110, and 112 or STA 200 and the AP is an example of AP 102. Timeline 500 shows the timing of beacon frames B1, B2, B3, and B4 as they are transmitted by the AP. The TBTTs are denoted by dotted lines and are separated by a duration equal to the beacon interval (BI). Beacon frames B1, B2, and B4 are shown to have BTT equal to TBTT, while BTT 582 of beacon frame B3 is slightly delayed from TBTT 580 of beacon frame B3. Timelines 520, 540, and 560 show the timing of events in STA A, STA B and STA C, respectively. Arrows 522, 542, and 562 are used to denote the time at which STA A, STA B, and STA C have a first uplink packet ready for transmission to the AP, respectively. In this simplified example, it assumed that each STA has an uplink packet ready for transmission immediately following the end of beacon frame B1, and consequently that the STAs will need to contend with each other for access to the wireless medium in order to transmit their packets. However, other event timings are contemplated. If not already in an awake state, each STA enters an awake state immediately after it determines that it has an uplink packet ready to transmit (as described at 304 in FIG. 3 and in FIG. 4) and proceeds to contend for access to the wireless medium (as described at 306 in FIG. 3 and in FIG. 4). Activity curves 524, 544, and 564 represent the STA activity that is associated with the transmission of the first uplink packet from STA A, STA B, and STA C, respectively. With the assumption that each STA is in a doze state when it determines that it has an uplink packet ready for transmission to the AP, each activity curve comprises a visible "ramp-up" period, during which the STA goes from the doze state to the awake state.

In this example, STA C is the first to gain access to the wireless medium, followed by STA A, and then STA B. Timeline 520 shows the activity curve 524 for STA A as a result of the determination that it has a first packet ready to transmit at 522. Following a power "ramp-up" period RT, STA A remains idle in the awake state while it waits for STA C to complete the transmission of its first uplink packet between time 566 and time 568. Following the end of STA C's transmission, STA A continues to remain idle in the awake state for a random backoff interval (RBI), and then uses CS to sense the medium for delay D. Thus, while not explicitly shown, the duration of activity curve 524 of STA A may include the duration of the "ramp-up" period RT, the amount of time that the wireless medium is busy due to the transmission from STA C to the AP, the RBI, and delay D. After sensing that the medium is idle for at least delay D, STA A transmits its packet in a manner receivable by the AP (as described at 308 in FIG. 3 and in FIG. 4). Once the packet has been successfully transmitted to the AP, STA A records time 526 as its target transmission time $T_A$ (as described at 310 in FIG. 3 and in FIG. 4), and returns to the doze state at time 528. For all STA packets described herein, successful transmission may be implicitly assumed, as in the method of FIG. 3, or may be explicitly confirmed by receipt of an ACK frame from the AP, as shown at 411 in FIG. 4.

Following the successful transmission of the first uplink packet from STA A to the AP, STA A remains in the doze state while checking for another uplink packet to send to the AP. While not explicitly shown in FIG. 5, it will be obvious to a person of ordinary skill in the art that STA A may enter the awake state at any time to receive downlink packets. For example, STA A may enter the awake state in anticipation of receiving one or more of beacon frames B1-B4. For simplicity, this timing diagram does not illustrate STA activity associated with the entry of STA A, STA B, or STA C into the awake state to receive beacon frames, nor their entry into the doze state thereafter.

Returning to timeline 520, STA A determines at 530 that a second uplink packet is ready to transmit to the AP. Rather than immediately entering the awake state and having to contend for access to the wireless medium using a CSMA/CA mechanism as it did in the previous beacon interval, STA A defers entering the awake state. Having recorded time $T_A$ after the BTT of beacon B1 that STA A successfully gained access to the wireless medium for transmission of the first uplink packet, STA A remains in the doze state in anticipation of this time $T_A$ after the TBTT of beacon frame B2, shown at time 534. Activity curve 532 illustrates the activity of STA A associated with the transmission of its second uplink packet to the AP. As described at 316 in FIG. 3 and in FIG. 4, STA A enters the awake state at a time prior to $T_A$ that is sufficient to allow for the power "ramp-up" time RT and the delay D for sensing the wireless medium. Following the successful transmission of its second uplink packet to the AP, STA A returns to the doze state at time 536.

This same procedure may be repeated for subsequent uplink packets, with the target transmission time $T_A$ taken relative to the preceding TBTT. For example, as shown in timeline 520, STA A determines at 538 that it is ready to transmit its third uplink packet to the AP. In this case, beacon frame B3 has been delayed from its TBTT shown at time 580, such that the BTT of beacon frame B3 is at a later time 582. STA A defers entering the awake state in anticipation of the next $T_A$ after TBTT 580 of beacon frame B3, rather than BTT 582 of beacon frame B3. While application of target transmission times relative to BTTs is also possible, certain situations are contemplated in which it may be beneficial to apply target transmission times relative to TBTTs. For example, there may be situations when the transmission of beacon frames from an AP is repeatedly delayed by different amounts relative to the TBTTs, such that the BTTs have inconsistent timing. If a STA associated with the AP were to apply its target uplink packet transmission times to the erratic BTTs, such that it attempted to transmit uplink packets at BTT+T, the periodicity of the transmissions from the STA to the AP might be disrupted, thereby affecting the quality of service.

Returning to FIG. 5, STA B must share the wireless medium with STA A and STA C in order to transmit uplink packets to the AP. As shown on timeline 540, STA B has a first uplink packet ready to transmit to the AP at 542. According to the methods illustrated in FIG. 3 and FIG. 4, if not already in the awake state, STA B immediately enters the awake state and proceeds to contend for and gain access to the wireless medium using a CSMA/CA mechanism. The activity associated with STA B's transmission of its first uplink packet is shown by activity curve 544. According to the example of FIG. 5, STA B is the last of the three STAs to gain access to the wireless medium. Therefore, while not explicitly shown, the duration of activity curve 544 may include the duration of the power "ramp-up" period RT, the amount of time that the wireless medium is busy due to the transmission from STA C to the AP and the transmission from STA A to the AP, one or more random backoff intervals RBI of STA B, and delay D. After sensing that the medium is idle for at least delay D, STA B transmits its first packet in a manner receivable by the AP (as described at 308 in FIG. 3 and in FIG. 4). Once the packet has been successfully transmitted to the AP, STA B records time 546 as its target transmission time $T_B$ (as described at 310 in FIG. 3 and in FIG. 4) and enters the doze state at time 548.

While in the doze state, STA B continues to check for another uplink packet to send to the AP, as described at 314 in FIG. 3 or in FIG. 4. In the example of FIG. 5, STA B determines that it has a second uplink packet ready to transmit to the AP at 550. Rather than immediately entering the awake state and having to contend for access to the wireless medium using a CSMA/CA mechanism as it did in the previous beacon interval, STA B defers entering the awake state in anticipation of its target transmission time $T_B$ relative to the TBTT of beacon frame B2, shown at time 554. Activity curve 552 illustrates the activity of STA B associated with the transmission of its second uplink packet to the AP. As described at 316 in FIG. 3 or in FIG. 4, STA B enters the awake state at a time prior to $T_B$ that is sufficient to allow for the "ramp-up" time RT and the delay D for sensing the wireless medium. Following the successful transmission of its second uplink packet to the AP, STA B returns to the doze state at time 556. This same procedure may be repeated for subsequent uplink packets, with the target transmission time $T_B$ taken relative to the preceding TBTT.

As shown in timeline 560, STA C has a first uplink packet ready to transmit to the AP at 562. According to the methods illustrated in FIG. 3 and FIG. 4, if not already in the awake state, STA C enters the awake state and proceeds to contend for and gain access to the wireless medium using a CSMA/CA mechanism. Given that STA C wins the contention and is the first STA to gain access to the wireless medium, it is not required to wait for any other STAs to communicate with the AP, nor is it required to remain idle for one or more random backoff intervals. Thus, while not explicitly shown, the duration of activity curve 564 may include only the duration of the power "ramp-up" period RT (assuming STA C was not already in the awake state when it determined that its first uplink packet was ready to transmit) and the delay D during which STA C uses CS to sense the wireless medium. After sensing that the medium is idle for at least delay D, STA C transmits its first uplink packet in a manner receivable by the AP (as described at 308 in FIG. 3 and FIG. 4). Upon determining that its first uplink packet has been successfully transmitted to the AP, STA C records time 566 as its target transmission time $T_C$ (as described at 310 in Figure and FIG. 4) and enters the doze state at time 568. As described above with respect to STA A and STA B, STA C may transmit subsequent uplink packets according to the method illustrated in FIG. 3 or FIG. 4, by entering the awake state in anticipation of its target transmission time $T_C$ after the most recent TBTT. In this case, since STA C was the first to gain access to the wireless medium, and therefore did not have to wait for other STAs to communicate with the AP or wait idle for any random backoff intervals, activity curve 570 associated with STA C's second uplink packet may have the same duration as activity curve 564.

It should be noted that, for simplicity, STA A, STA B and STA C are shown to record their respective actual transmission times during the same beacon interval (between B1 and B2). However, it is contemplated that one STA may initiate the proposed framework during a different beacon interval than another STA. It should also be noted that, while each STA is shown to have an uplink packet ready for transmission during each beacon interval illustrated in FIG. 5, situations are contemplated in which a STA may not have an uplink packet to transmit during one or more beacon intervals subsequent to the first beacon interval. In such situations, the STA may still follow the methods illustrated in FIG. 3 or FIG. 4 by checking for uplink packets at 314, and, upon determining that it has an uplink packet in queue, entering the awake state at the next closest TBTT+T−RT−D, as described at 316.

In absence of the proposed method, each STA would always be expected to enter the awake state immediately following a determination that it has an uplink packet ready to transmit to the AP. Therefore, if all three STAs have uplink packets ready to transmit at approximately the same (as shown by arrows 522, 542 and 562 in FIG. 5), they will need to contend with each other for access to the wireless medium. Only one STA can be the first to win the contention, while each of the remaining STAs must wait idle in the awake state for a different amount of time depending on transmission timing or duration or both between the other STAs and the AP, as well as the duration that it selected for its own random backoff interval(s). Thus, each time the STAs are ready transmit an uplink packet at approximately the same time, the result will be a set of activity curves that are similar to curves 524, 544 and 564 in FIG. 5. While the duration of each STA's activity curve might vary from one uplink packet transmission to the next (depending on when it gained access to the wireless medium), the ensemble of activity curves for all STAs would be reasonably consistent: all STAs would enter the awake state at the same time, and some would need to remain in the awake state longer than others. In contrast, the methods illustrated in FIG. 3 and FIG. 4 would allow for an ensemble of activity curves similar to curves 532, 552, and 570, with less idle time in the awake state. By self-scheduling their transmission of uplink frames according to previously successful transmission times, on average, STA A, STA B and STA C would be able to remain in the doze state for a longer period of time. Aside from transmission of its first packet, when its target transmission time is defined, the amount of time that a STA would be required to be in the awake state would be consistent from one uplink packet to the next and would no longer be dependent upon transmission timing or duration or both made between other STAs and the AP, or dependent on one or more random backoff intervals. This is because all the STAs would be self-scheduling their uplink packet transmissions at different target transmission times and might only need to be in the awake state at those times. For example, a comparison of activity curves 524, 544 and 564 to activity curves 532, 552 and 570 shows that the average amount of time in the awake state for STAs using traditional methods of contending for access to the wireless medium (see, for example, the average duration of activity curves 524, 544 and 564) is longer than the average amount of time in the awake state for STAs using the method illustrated in FIG. 3 or FIG. 4 (see, for example, the average duration of activity curves 532, 552, and 570). Given that a reduction in the amount of time a STA is in the awake state translates to a reduction in power consumption, the potential power saving offered by the proposed framework is evident.

Figure 6:
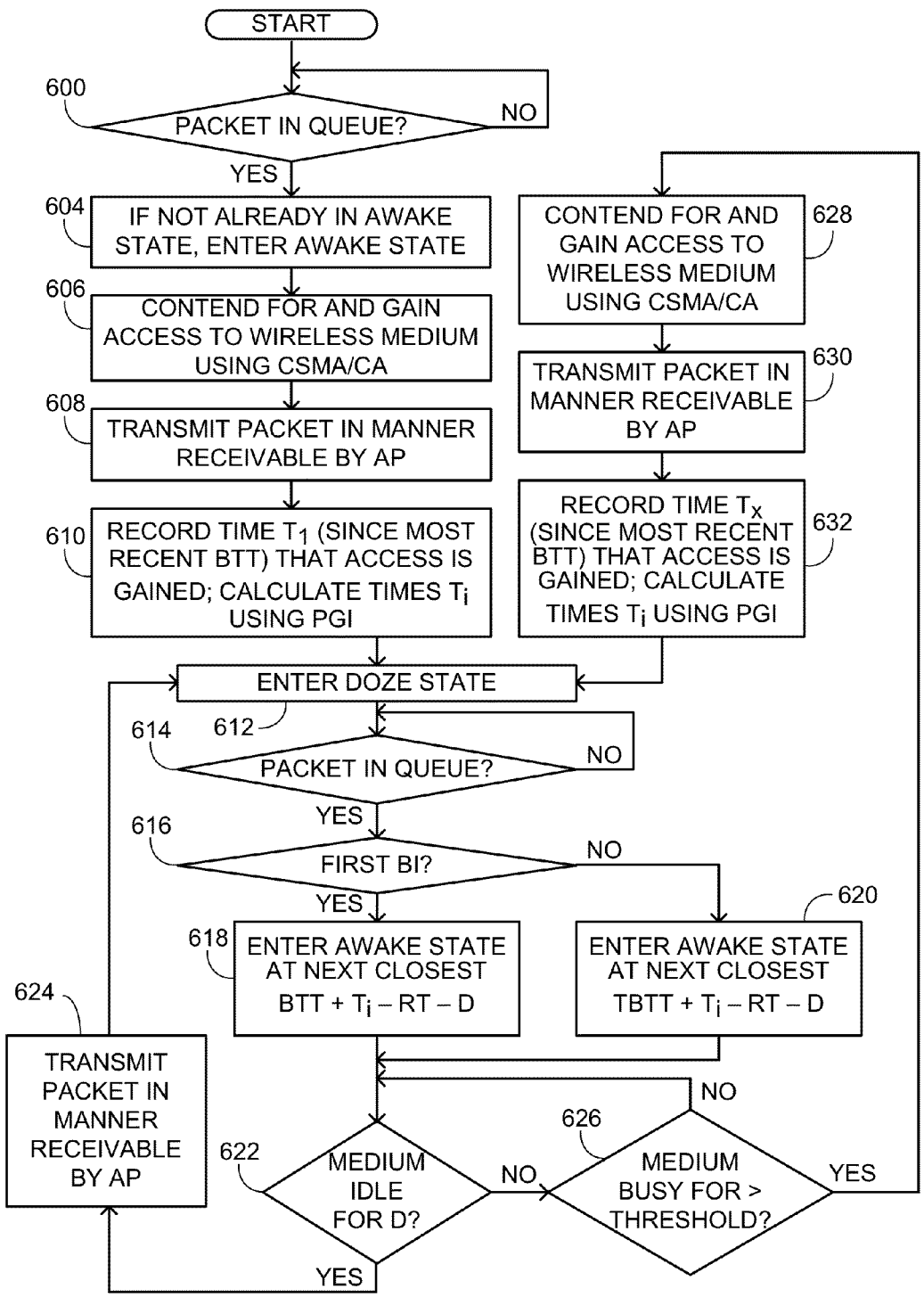
FIG. 6 is a flowchart of a first example method in a STA for power saving and scheduling multiple uplink transmission times within a beacon interval.
Figure 7:
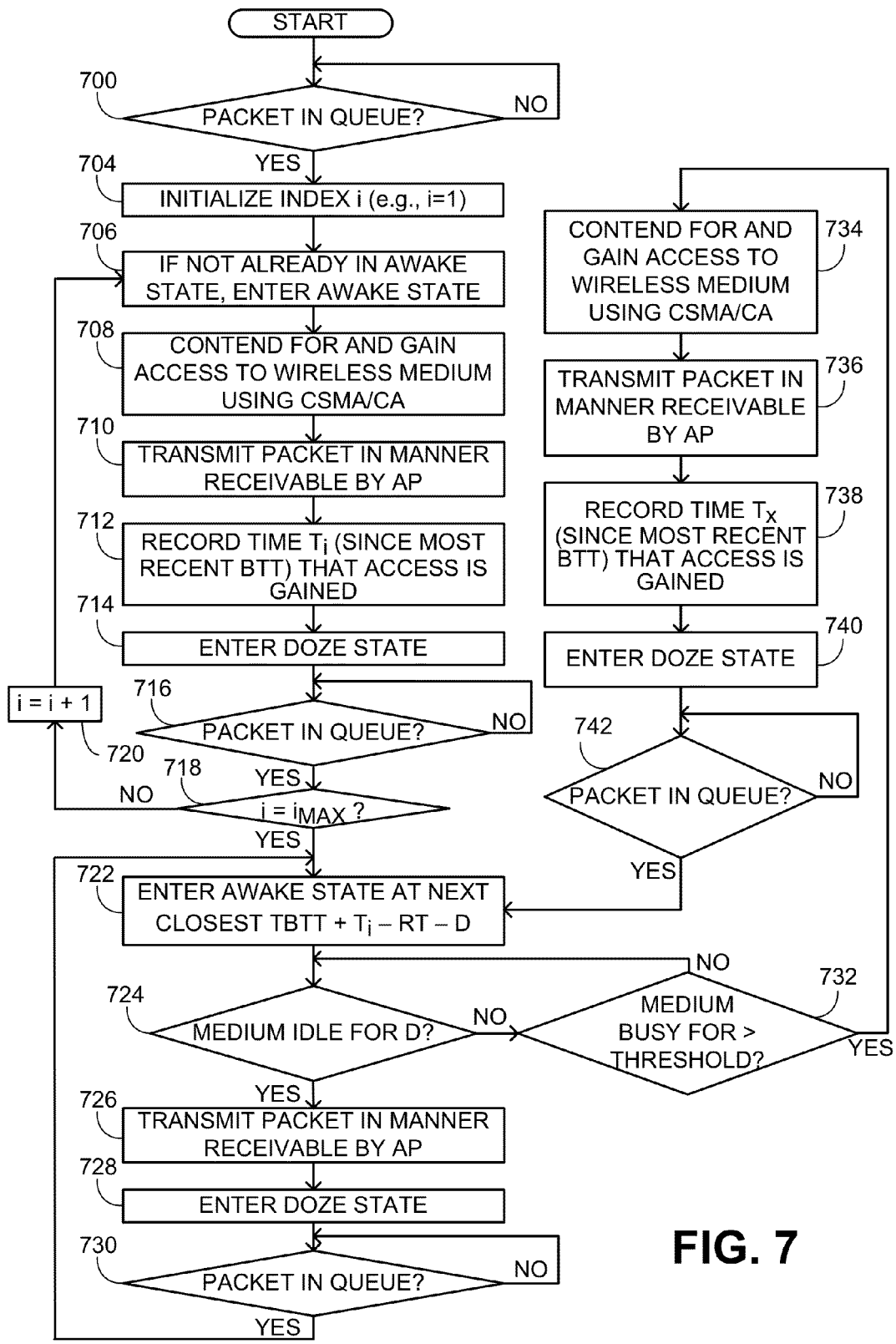
FIG. 7 is a flowchart of a second example method in a STA for power saving and scheduling multiple uplink transmission times within a beacon interval.

The power saving offered by this framework may become even more significant when extended to situations when STAs seek to transmit multiple uplink packets during each beacon interval, for example, during voice communication sessions. In a STA with a G.711 voice codec, voice packets may be generated every 20 ms. A typical beacon interval of an AP with which the STA is associated might be 100 ms. If this STA is in a BSS with other STAs that are also generating voice packets every 20 ms, when following traditional methods of medium access to transmit uplink packets to the AP, each STA has the potential of having to undergo a contention and back-off process 5 times during a beacon interval. FIG. 6 and FIG. 7 show two example methods for self-scheduling uplink transmission times when a STA has multiple uplink packets to transmit to an AP during a beacon interval, for example, when the STA has a voice codec that periodically generates voice packets at an interval shorter than the beacon interval. Variations of these scheduling methods are contemplated. For example, while not explicitly shown in FIG. 6 or FIG. 7, incorporation of an acknowledgement (ACK) frame to confirm the successful receipt of an uplink packet by the AP is contemplated (see the method illustrated in FIG. 4). Additionally, when defining the target transmit time(s), reservation of the wireless medium using request to send (RTS) and clear to send (CTS) frames is also contemplated when required to address the hidden node problem.

FIG. 6 is a flowchart of an example method in a STA that may be used for power saving and scheduling multiple uplink packet transmission times within a beacon interval. This method may be preferable in a STA in a BSS with other STAs that have the same packet generation interval, for example, STAs that have the same voice codec. At 600, a power saving STA checks whether it has an uplink packet in its transmission queue that is ready to be transmitted to the AP with which the STA is associated. Once the STA determines at 600 that it has an uplink packet in its transmission queue that is ready to be transmitted to the AP with which the STA is associated, the STA proceeds to 604 where, if the STA is not already in an awake state, the STA enters an awake state. At 606 the STA proceeds to use a CSMA/CA mechanism to contend for and gain access to the wireless medium. At 608, the STA transmits its first queued uplink packet in a manner receivable by the AP. Although not explicitly shown, the STA may use CS to sense that the wireless medium is idle for a specific period of time prior to transmitting the packet, for example, delay D described previously. At 610, the STA records the time $T_1$ that access to the wireless medium was gained after the most recent BTT. This time $T_1$ is used to define a target transmission time for a first packet to be transmitted during a beacon interval (BI). The time $T_1$ may include delay D. The STA also calculates at 610 additional target transmission times, based on the recorded value of $T_1$. For the example where all STAs in the BSS will seek to transmit uplink packets at the same known packet generation interval, and it is known how many packets will fit within BI, it may be possible to calculate all subsequent target transmission times $T_i$ based on the value determined for the first target transmission time $T_1$. For example, if the packet generation interval is PGI, and five packets are expected to be generated during every BI, the STA may define five target transmission times, the first of which is recorded and the others of which are calculated: $T_1$, $T_2=T_1+$PGI, $T_3=T_1+2\cdot$PGI, $T_4=T_1+3\cdot$PGI, and $T_5=T_1+4\cdot$PGI.

In this example, the STA assumes that the uplink packet was successfully received by the AP and enters the doze state at 612. While in the doze state, the STA checks at 614 if there is a second uplink packet in its transmission queue. Once the STA determines that there is a second packet, it waits in anticipation of the next target transmission time $T_i$, as calculated at 610. Assuming no gap in packet generation (i.e., each new uplink packet is generated at the packet generation interval), the next target transmission time is $T_2$. At 616 the STA determines that the current BI is the first for which the method is being implemented. This means that the target transmission time $T_2$ should be applied relative to the BTT. Therefore, at 618, the STA enters the awake state in anticipation of the target transmission time $T_2$ relative to the most recent BTT, allowing time RT for power "ramp-up" and delay D for sensing the medium, as described in previous examples. Note that if it is determined at 616 that the current BI is not the first for which the method is being implemented, the target transmission times should be applied relative to the most recent TBTT. In this case, at 620 the STA would enter the awake state at the next closest TBTT+$T_i$-RT-D. At 622, the STA uses CS to check whether the wireless medium is idle for at least delay D.

If the wireless medium is found at 622 to be idle throughout delay D, the STA may skip the contention process altogether, and proceed to 624 where it transmits its second uplink packet in a manner receivable by the AP. Following successful transmission of this packet to the AP, the STA enters the doze state again at 612, checks for a new uplink packet at 614, and waits to enter the awake state in anticipation of the next target transmission time $T_i$. This process may be repeated for each new uplink packet that is generated.

If the STA determines at 622 that the wireless medium was busy during delay D, the STA may proceed to determine for how long the medium remains busy. If the STA determines at 626 that the wireless medium is not busy for more than a threshold time, as discussed previously with respect to FIGS. 3 and 4, the STA may return to 622 and again check that the wireless medium remains idle throughout delay D. Once the STA determines at 622 that the wireless medium is idle throughout delay D, the STA may proceed to transmit its second uplink packet at 624.

If the STA determines at 626 that the wireless medium is busy for longer than the threshold time, the STA may proceed to 628 to contend for and gain access to the wireless medium using CSMA/CA in order to transmit the packet. The STA may determine that one or more of the target transmission times $T_i$ previously determined at 610 are unsuitable for self-scheduling of future uplink transmissions. Thus, following successful transmission of the packet at 630, the STA may record a new target transmission time Tx at 632 to replace the most recent target transmission time Tx. For example, if the STA last entered the awake state for the target transmission time $T_2$, the STA may record a new target transmission time $T_2$ at 632. The STA may also calculate additional target transmission times at 632 to replace the other target transmission times $T_i$ previously determined at 610. In this case, the new target transmission times $T_i$ may be calculated based on the recorded value of $T_2$, such that, if the packet generation interval is PGI, and five packets are expected to be generated during every BI, the STA may define five target transmission times, the second of which is recorded and the others of which are calculated: $T_1=T_2-PGI$, $T_2$, $T_3=T_2+PGI$, $T_4=T_2+2 \cdot PGI$, and $T_5=T_2+3 \cdot PGI$.

Although not explicitly illustrated in FIG. 6, the STA may not replace the previously recorded times $T_i$ even if the wireless medium is busy for longer than the threshold time. For example, the STA may only replace the previously recorded times $T_i$ with new times $T_i$ if the number of times the wireless medium is busy for longer than the threshold time exceeds some maximum number of times.

The method illustrated in FIG. 6 may be of particular benefit when used in STAs that generate packets at a fixed rate. Consider, for example, a BSS with two STAs, STA A and STA B, where STA A generates packets at an interval $PGI_A$ and STA B generates packets at an interval $PGI_B$. STA A sets its first target transmission time to $T_{1A}$ and STA B sets its first target transmission time to $T_{1B}$, where $T_{1B} > T_{1A}$. Provided that STA A schedules transmission of its second uplink packet at $T_{1A}+PGI_A$, STA B can be reasonably assured that the wireless medium will be available for it to transmit its second packet at $T_{1B}+PGI_B$. The same logic follows for all subsequent packets in the beacon interval. The method illustrated in FIG. 6 may also be of particular benefit when each STA generates packets having a fixed length, for example, when STA A generates packets having a fixed length $L_A$, and when STA B generates packets having a fixed length $L_B$.

As an alternative to calculating subsequent target transmission times within a beacon interval based on the first target transmission time, a STA may define all target transmission times according to the times that it gained access to the wireless medium through the traditional contention process during the first full beacon interval. This method, which is illustrated in the flowchart shown in FIG. 7, may be of interest for a STA in a BSS with other STAs that generate packets at different packet intervals. At 700, a power saving STA checks whether it has an uplink packet in its transmission queue that is ready to be transmitted to the AP with which the STA is associated. Once the STA determines at 700 that it has an uplink packet in its transmission queue that is ready to be transmitted to the AP with which the STA is associated, the STA initializes an index "i" at 704, for example, by setting it equal to 1. Index i may be used to denote the index of the target transmission times $T_i$ defined within a beacon interval. If not already in an awake state, the STA enters an awake state at 706 and proceeds to use a CSMA/CA mechanism to contend for and gain access to the wireless medium at 708. At 710, the STA transmits its first queued uplink packet in a manner receivable by the AP. Although not explicitly shown, the STA may use CS to sense that the wireless medium is idle for a specific period of time prior to transmitting the packet, for example, delay D. At 712 the STA records the time $T_i$ that access to the wireless medium was gained after the most recent BTT. Currently, index i is still at its initial value of 1, and therefore the STA defines its first target transmission time $T_1$ at 712. Target transmission time $T_1$ may include delay D.

In this example, the STA assumes that the uplink packet transmitted at 710 was successfully received by the AP. Following recordation of the first target transmission time $T_1$ at 712, the STA enters the doze state at 714. While in the doze state, the STA checks at 716 if there is a second uplink packet in its transmission queue. Once the STA determines that there is a second packet, it checks at 718 to see if the maximum number of target transmission times $i_{MAX}$ within a beacon interval has been defined. $i_{MAX}$ may depend on, for example, the packet generation interval and the beacon interval. For the purposes of this simplified example, it will be assumed that $i_{MAX} > 1$, such that the STA proceeds to 720 where it increments i by 1. The STA then proceeds to enter the awake state at 706, contend for and gain access to the wireless medium at 708, transmit its second uplink packet to the AP at 710, record its second target transmission time $T_2$ at 712, and return to the doze state at 714.

This process of contention and recording of target transmission times $T_i$ may be repeated until the STA determines at 718 that index i has reached its maximum value $i_{MAX}$. At this point, all of the target transmission times $T_i$ within a beacon interval have been defined. Accordingly, the STA may attempt to transmit its next uplink packet (that was determined to be ready for transmission at 716) at the next closest $TBTT+T_i$. The STA may remain in the doze state as it waits in anticipation of this time. For example, as shown at 722, the STA enters the awake state in anticipation of the target transmission time $T_i$, allowing time RT for power "ramp-up" and delay D for sensing the medium, as described in previous examples. If the wireless medium is found at 724 to be idle throughout delay D, the STA may skip the contention process altogether and may proceed to 726 where it transmits its queued uplink packet in a manner receivable by the AP. Following successful transmission of this packet to the AP, the STA enters the doze state again at 728. The STA remains in the doze state while it checks for new uplink packets in its transmission queue at 730. When a new uplink packet is ready, the STA delays entering the awake state to transmit the packet until the next closest $TBTT+T_i-RT-D$, as shown at 722. This process of entering the awake state in anticipation of the next closest target transmission time may be repeated for each new uplink packet that is generated.

If the STA determines at 724 that the wireless medium was busy during delay D, the STA may proceed to determine for how long the medium remains busy. If the STA determines at 732 that the wireless medium is not busy for more than a threshold time, as discussed previously, the STA may return to 724 and again check that the wireless medium remains idle throughout delay D. If the STA determines at 732 that the wireless medium is busy for longer than the threshold time, the STA may proceed to 734 and again contend for and gain access to the wireless medium using CSMA/CA in order to transmit the packet. The STA may determine that the most recent target transmission time $T_x$ previously recorded at 712 is unsuitable for self-scheduling of future uplink transmissions. Thus, following successful transmission of the packet at 736, the STA may record a new target transmission time $T_x$ at 738 to replace the most recent target transmission time $T_x$. For example, if the STA last entered the awake state for the target transmission time $T_2$, the STA may record a new target transmission time $T_2$ at 738. After recordation of the new target transmission time $T_2$, the STA may enter the doze state at 740. Once the STA determines at 742 that there is another packet in its transmission queue, the STA may enter the awake state at the next closest TBTT+$T_i$−RT−D, as shown at 722.

Although not explicitly illustrated in FIG. 7, if the STA determines at 732 that the wireless medium was busy for longer than the threshold time, the STA may determine that all the target transmission times $T_i$ previously recorded at 712 are unsuitable for self-scheduling of future uplink transmissions. In this case, the STA may follow a procedure similar to that used during the initial recording of target transmission times $T_i$. However, it is contemplated that the target transmission times may be recorded in a different order than was previously done. For example, if the maximum number of target transmission times per beacon interval is five, that is $i_{MAX}$=5, the new target transmission times could be recorded in the following order: $T_3$, $T_4$, $T_5$, $T_1$, $T_2$. The order may depend on the most recent target transmission time for which the wireless medium was found to be busy for longer than the threshold time.

Although not explicitly illustrated in FIG. 7, the STA may only replace the previously recorded target transmission times $T_i$ under certain circumstances. For example, if the STA senses at 732 that the wireless medium is busy for longer than the threshold time a sufficient number of times when attempting to transmit at a previously recorded target transmission time, the STA may overwrite one or more of the previously recorded target transmission times with one or more new target transmission times. As noted previously, the problem of power consumption by STAs competing for access to a wireless medium is exacerbated when an AP with which the STAs are associated restricts the time available to the STAs for transmissions. Such restrictions will occur, for example, if the AP is part of a WLAN mesh network and therefore has to reserve some of its time for transferring communications to other APs. Such restrictions will also occur, for example, if the AP implements power-saving techniques that require the AP to enter a low-power state or other state in which it reduces its availability to communicate with STAs. STAs associated with an AP may experience a backlog of uplink packets in their transmission queues for uplink packets that are generated during a time that the AP is not available to the STAs for transmissions.

The AP will likely inform the STAs of its availability by communicating an indication of its availability to the STAs, for example, in a beacon frame. The STAs will all attempt to access the wireless medium at the start of an availability period in order to transmit their uplink packets, thus leading to contention for access to the wireless medium. The more STAs associated simultaneously with the AP that are involved in voice communication sessions, the worse the problem. If the STAs implement the framework described herein, then future competition for the wireless medium may be avoided.

Figure 8:
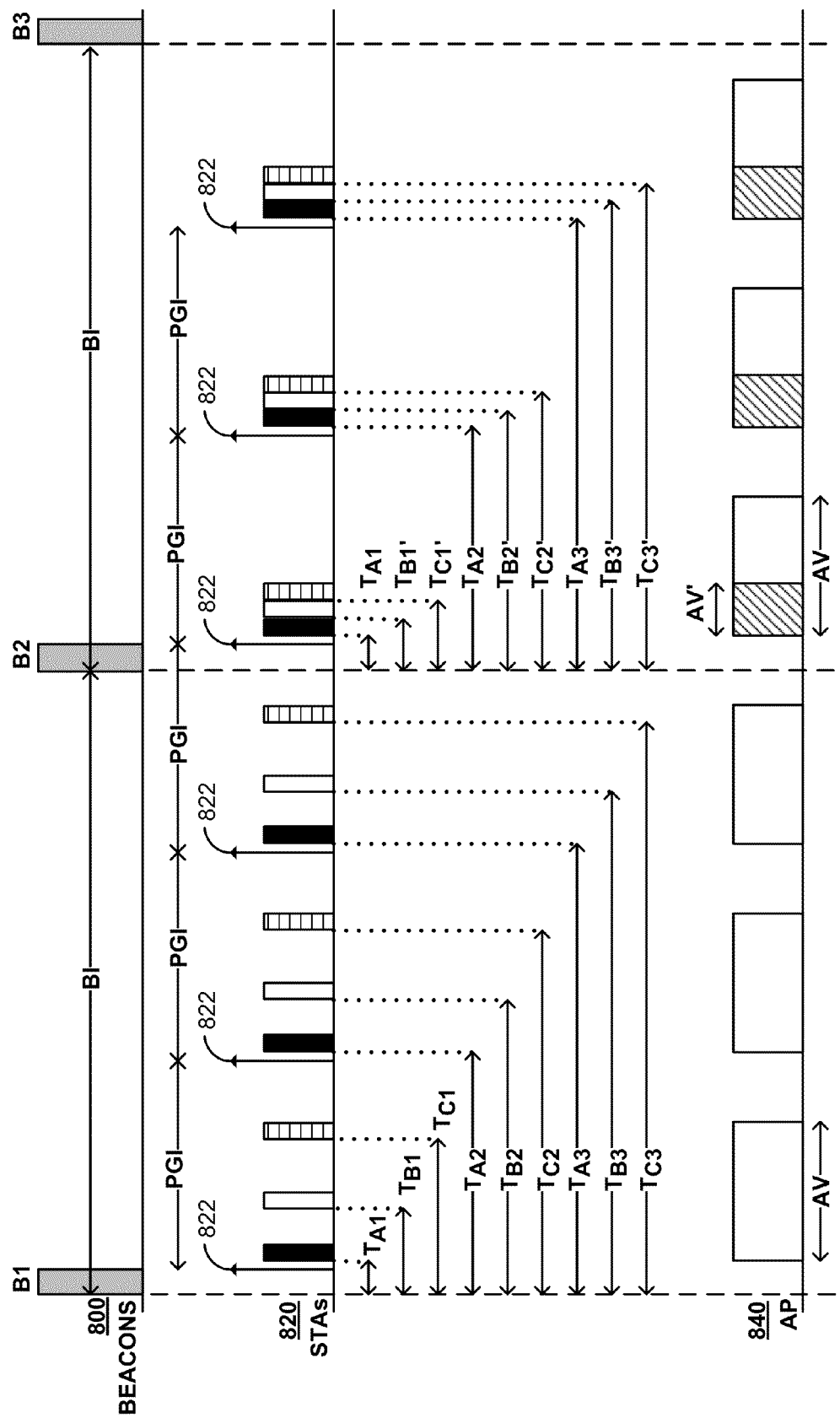
FIG. 8 is a simplified timing diagram of example events in a BSS comprising three STAs and an AP, where each STA is implementing a variation of the method illustrated in FIG. 6.

In addition to the potential reduction in power consumption of STAs implementing the methods described above, a variation of the proposed framework may extend power saving benefits to the AP with which the STAs are associated. FIG. 8 is a simplified timing diagram of example events in a BSS comprising an AP and three wireless client devices (STA A, STA B, and STA C) that are each implementing a variation of the method illustrated in FIG. 6. Each STA has the same packet generation interval (denoted PGI). STA A, STA B, and STA C are examples of STAs 108, 110, and 112 or STA 200 and the AP is an example of AP 102. Timeline 800 shows the timing of beacon frames B1, B2, and B3 as they are transmitted by the AP. The target beacon transmission times (TBTT) are denoted by dotted lines and are separated by a duration equal to the beacon interval (BI). In this example, the BTTs are equal to the TBTTs. Timeline 820 shows the timing of uplink packet transmissions to the AP from STA A, STA B and STA C, by a solid black bar, a solid white bar, and a horizontal striped bar, respectively. For clarity, the activity curves associated with each uplink packet have been omitted. Arrows 822 denote the times at which all three STAs determine that they have an uplink packet ready to transmit to the AP.

Following the first arrow 822 of the first BI shown in FIG. 8, each STA enters an awake state to contend with the other two for access to the wireless medium in order to transmit its first uplink packet to the AP (as described at 608 in FIG. 6). STA A transmits its packet first, recording the time that it gained access to the medium as its first target transmission time, $T_{A1}$. STA B is the second STA to gain access to the wireless medium, and records time $T_{B1}$ as its first target transmission time. The delay shown between $T_{A1}$ and $T_{B1}$ includes at least the transmission time for STA A's first uplink packet and one or more random backoff intervals selected by STA B. STA C is the final STA to gain access to the wireless medium, and records time $T_{C1}$ as its first target transmission time. The delay shown between $T_{A1}$ and $T_{C1}$ includes at least the transmission times for STA A's first uplink packet and STA B's first uplink packet, as well as the one or more random backoff intervals selected by STA C. As described at 610 in FIG. 6, subsequent target transmission times for each STA may be calculated based on PGI and BI. In this particular example, each STA generates uplink packets at a rate that allows for three target transmission times per BI. The target transmission times for STA A are $T_{A1}$, $T_{A2}$, and $T_{A3}$; the target transmission times for STA B are $T_{B1}$, $T_{B2}$, and $T_{B3}$; and the target transmission times for STA C are $T_{C1}$, $T_{C2}$, and $T_{C3}$. According to the method illustrated in FIG. 6, each STA will attempt to transmit future uplink packets at its target transmission times, relative to the most recent TBTT. As noted previously, rather than entering the awake state as soon as it has an uplink packet ready to transmit to the AP (as shown by arrows 822), each STA may prolong its time in the doze state by deferring its entrance into the awake state in anticipation of its target transmission times.

While the resulting power-saving benefits to each STA have already been described, the AP may also benefit through modifications to this framework. As discussed above, an AP may restrict the amount of time it is available to communicate with STAs in a BSS. For example, an AP in a WLAN mesh network may have to reserve some of its time for transferring communications to other APs, while an AP that implements power-saving techniques may periodically enter a low-power state with reduced availability. Consequently, an AP may have a limited number of availability periods between beacon frames during which STAs may transmit uplink frames. Timeline 840 describes the amount of time that the AP may be required to be available in order to receive the uplink packets being transmitted from STAs A, B and C. If the STAs continue to transmit future uplink packets using the target transmission times recorded during the first beacon interval (according to the method illustrated in FIG. 6), the AP may need to have availability periods of duration AV. However, some of this time AV may coincide with times that none of the STAs are transmitting packets. This inefficient use of the AP may result in unnecessary AP power consumption. However, in a variation of the method illustrated in FIG. 6, once the target transmission times have been defined during the first beacon interval, a STA may attempt use earlier target transmission times for the purpose of stacking uplink packet transmissions closer together. For example, referring to the second B1 in FIG. 8 (between B2 and B3), rather than attempting to transmit its first uplink packet at its self-scheduled target transmission time $T_{B1}$, STA B could attempt to transmit at a slightly earlier time. For example, when STA B records target transmission time $T_{B1}$ (as described at 610 in FIG. 6) during the first BI, STA B could also record the value of the random backoff interval ($RBI_B$) that it used during the contention at 606. Then, during the second BI, rather than entering the awake state in anticipation of time TBTT+$T_{B1}$ (as described at 618 in FIG. 6), STA B could enter the awake state a time $RBI_B$ earlier and attempt to transmit the uplink packet at a time TBTT+$T_{B1'}$, where $T_{B1'}=T_{B1}-RBI_B$. If the packet is successfully transmitted, STA B may set $T_{B1'}$ as its new target transmission time for the first uplink packet following each TBTT. STA B may also calculate new target transmission times $T_{B2'}$ and $T_{B3'}$ for the second and third uplink packets, respectively, as shown in FIG. 8.

In this same manner, STA C could record the value of the one or more random backoff intervals ($RBI_C$) that it used during the contention that preceded the recording of $T_{C1}$. Then, STA C may attempt to transmit its first uplink packet of the second beacon interval at a time TBTT+$T_{C1'}$, where $T_{C1'}=T_{C1}-RBI_C$. If the packet is successfully transmitted, STA C may set $T_{C1'}$ as its new target transmission time for the first uplink packet following each TBTT. STA C may also calculate new target transmission times $T_{C2'}$ and $T_{C3'}$ for the second and third uplink packets, respectively, as shown in FIG. 8.

If a STA is unable to successfully transmit an uplink frame at a time RBI earlier than one of its original target transmission times, it may contend for and gain access to the medium, as at 628 in FIG. 6, and may replace the original target transmission time with a new target transmission time. It may also recalculate the other target transmission times within the beacon interval based on this newly defined time. Alternatively, if the STA is unable to transmit an uplink frame at a time RBI earlier than one of its original target transmission times, it may wait until the next closest original target transmission time before attempting to transmit.

In an attempt to stack its uplink packet transmissions closer to transmissions from other STAs, a STA may periodically attempt to use earlier target transmission times during a communication session. It will be obvious to a person of ordinary skill in the art that target transmission times may be reduced by some other value than the random backoff interval and still offer the potential for closer stacking of uplink packets.

By following this variation of the method illustrated in FIG. 6 and stacking their uplink packets closer together, STAs in a BSS may make more efficient use of an AP with which they are associated. As a result, the AP may be able to reduce the duration of its availability periods. For example, AV' in FIG. 8 represents the duration of the availability periods necessary for receiving the newly stacked uplink packets from STA A, STA B, and STA C. By reducing the duration of its availability periods from AV to AV', the AP may reduce its power consumption or gain more time for communication with other APs in a WLAN mesh network or both. Alternatively, even if the AP maintains the same duration AV for its availability periods, the AP may have a longer uninterrupted portion of idle time (as opposed to the numerous shorter segments shown in the first beacon interval of FIG. 8), which could lead to improved network capacity or higher throughput or both. Longer uninterrupted portions of idle time may enable the AP to accommodate transmissions from other STAs, whereas numerous shorter segments of idle time may be insufficient for the AP to accommodate transmission times of data packets. For example, for a QoS AP, the decision to admit a new traffic stream may depend on the channel resources available.

When a STA implementing the above framework ends a communication session with the AP, for example, by ending a voice call, the target transmission times that it recorded may be deleted or replaced with new target transmission times the next time it starts a communication session. The slots associated with these target transmission times may now correspond to time that the AP is idle. If this new AP idle time occurs immediately between busy periods, other STAs in the BSS may attempt to use earlier target transmission times in an attempt to fill the gap. Alternatively, if a new STA joins the BSS, it may take over the slots previously used by the recently departed STA. If a sufficient number of STAs end their communication sessions with the AP, the remaining STAs may be prompted by an announcement from the AP to contend for access to the wireless medium as shown, for example, at 628 in FIG. 6, and to define new target transmission times as shown, for example, at 632 in FIG. 6.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a wireless client device of self-scheduling access to a wireless medium, the method comprising:
   determining that an uplink packet is ready for transmission;
   using a carrier sense multiple access with collision avoidance (CSMA/CA) mechanism in an attempt to gain access to said wireless medium to transmit said uplink packet;
   as a result of said attempt, gaining access to said wireless medium at a time T after a transmission time of a most recent beacon frame from an access point, wherein said wireless client device is associated with said access point;
   recording T;
   in response to gaining access to said wireless medium, transmitting said uplink packet in a manner receivable by said access point;
   self-scheduling first target transmission times for one or more future uplink packets to be transmitted in said manner, wherein each of said first target transmission times is T–RBI after a respective expected transmission time of a beacon frame from said access point, wherein RBI is a non-negative number that is less than or equal to a sum of any random backoff intervals that were used by said wireless client device during said attempt;
   determining that another uplink packet, which is one of said future uplink packets, is ready for transmission; and
   for a purpose of transmitting said other uplink packet at a next upcoming one of said first target transmission times in said manner, waiting to initiate a carrier sense (CS) mechanism to sense availability of said wireless medium for said purpose until a predetermined time prior to said next upcoming one of said first target transmission times.

2. The method as claimed in claim 1, further comprising:
if said wireless client device is in a doze state when said other uplink packet is determined to be ready for transmission, waiting to enter an awake state from said doze state until a latest time that permits initiation of said CS mechanism at said predetermined time prior to said next upcoming one of said first target transmission times.

3. The method as claimed in claim 1, wherein said CSMA/CA mechanism is initiated at a start of an upcoming availability period of said access point, wherein said start of said upcoming availability period depends on an indication of availability that is communicated by said access point to said wireless client device in a beacon frame.

4. The method as claimed in claim 1, wherein said attempt comprises a contention for access to said wireless medium with one or more other wireless client devices that are associated with said access point.

5. The method as claimed in claim 1, further comprising:
enabling periodic generation of said future uplink packets at a predefined packet generation interval that is less than a duration between expected transmission times of any two successive future beacon frames,
initiating said CSMA/CA mechanism at a start of a next availability period of said access point, wherein said start of said next availability period depends on an indication of availability that is communicated by said access point to said wireless client device in a beacon frame;
self-scheduling calculated target transmission times for one or more other future uplink packets to be transmitted in said manner, wherein each of said calculated target transmission times is at a positive integer multiple of said packet generation interval after a respective one of said first target transmission times, and wherein a sum of said positive integer and 1 does not exceed a maximum number of future uplink frames expected to be ready for transmission during said duration as a result of said periodic generation;
determining that a further uplink packet is ready for transmission; and
for a purpose of transmitting said further uplink packet in said manner at a next upcoming one of assorted target transmission times, waiting to initiate said CS mechanism to sense availability of said wireless medium for said purpose until said predetermined time prior to said next upcoming one of said assorted target transmission times,
wherein said assorted target transmission times consist of said first target transmission times and said calculated target transmission times.

6. The method as claimed in claim 5, further comprising:
if said wireless client device is in a doze state when said further uplink packet is determined to be ready for transmission, waiting to enter an awake state from said doze state until a latest time that permits initiation of said CS mechanism at said predetermined time prior to said next upcoming one of said assorted target transmission times.

7. The method as claimed in claim 5, further comprising:
sensing availability of said wireless medium using said CS mechanism throughout a sensing interval, wherein said sensing interval starts at said predetermined time prior to said next upcoming one of said assorted target transmission times and ends at said next upcoming one of said assorted target transmission times.

8. The method as claimed in claim 7, further comprising:
sensing that said wireless medium is available throughout said sensing interval;
gaining access to said wireless medium for said purpose of transmitting said further uplink packet; and
transmitting said further uplink packet in said manner at said next upcoming one of said assorted target transmission times.

9. The method as claimed in claim 7, further comprising:
sensing that said wireless medium is unavailable for at least part of said sensing interval; and
as a result of sensing that said wireless medium is unavailable for at least part of said sensing interval, initiating said CSMA/CA mechanism in an attempt to gain access to said wireless medium to transmit said further uplink packet.

10. The method as claimed in claim 5, wherein said further uplink packet initiates delivery of one or more downlink packets from said access point in a manner receivable by said wireless client device.

11. The method as claimed in claim 10, wherein said further uplink packet comprises a trigger frame belonging to a particular access category and said one or more downlink packets are categorized as belonging to said particular access category.

12. The method as claimed in claim 11, wherein said predetermined time is dependent upon said particular access category.

13. A wireless client device comprising:
a wireless communication interface through which said device able to establish a wireless communication link over a wireless medium with an access point with which said wireless client device is associated;
a processor operative:
to determine that an uplink packet is ready for transmission;
to use a carrier sense multiple access with collision avoidance (CSMA/CA) mechanism in an attempt to gain access to said wireless medium to transmit said uplink packet;
as a result of said attempt, to gain access to said wireless medium at a time T after a transmission time of a most recent beacon frame from said access point;
to record T in said memory;
in response to gaining access to said wireless medium, to transmit said uplink packet in a manner receivable by said access point;
to self-schedule first target transmission times for one or more future uplink packets to be transmitted in said manner, wherein each of said first target transmission times is T−RBI after a respective expected transmission time of a beacon frame from said access point, wherein RBI is a non-negative number that is less than or equal to a sum of any random backoff intervals that were used by said wireless client device during said attempt;
to determine that another uplink packet, which is one of said future uplink packets, is ready for transmission; and
for a purpose of transmitting said other uplink packet at a next upcoming one of said first target transmission times in said manner, to wait to initiate a carrier sense (CS) mechanism to sense availability of said wireless medium for said purpose until a predetermined time prior to said next upcoming one of said first target transmission times.

14. The wireless client device as claimed in claim 13, wherein said processor is further operative:
to enable periodic generation of said future uplink packets at a predefined packet generation interval that is less than a duration between expected transmission times of any two successive future beacon frames;

to initiate said CSMA/CA mechanism at a start of a next upcoming availability period of said access point, wherein said next upcoming availability period depends on an indication of availability that is communicated by said access point to said wireless client device in a beacon frame;

to self-schedule calculated target transmission times for one or more other future uplink packets to be transmitted in said manner, wherein each of said calculated target transmission times is at a positive integer multiple of said packet generation interval after a respective one of said first target transmission times, and wherein a sum of said positive integer and one does not exceed a maximum number of future uplink frames expected to be ready for transmission during said duration as a result of said periodic generation;

to determine that a further uplink packet is ready for transmission; and for a purpose of transmitting in said manner said further uplink packet at a next upcoming one of assorted target transmission times, to wait to initiate said CS mechanism to sense availability of said wireless medium for said purpose until said predetermined time prior to said next upcoming one of said assorted target transmission times, wherein said assorted target transmission times consist of said first target transmission times and said calculated target transmission times.

15. The wireless client device as claimed in claim 14, wherein said processor is further operative:

if said wireless client device is in a doze state when said further uplink packet is determined to be ready for transmission, to wait to enter an awake state from said doze state until a latest time that permits initiation of said CS mechanism at said predetermined time prior to said next upcoming one of said assorted target transmission times.

16. The wireless client device as claimed in claim 14, wherein said attempt comprises a contention for access to said wireless medium with one or more other wireless client devices that are associated with said access point.

17. The wireless client device as claimed in claim 14, wherein said processor if further operative:

to sense availability of said wireless medium using said CS mechanism throughout a sensing interval, wherein said sensing interval starts at said predetermined time prior to said next upcoming one of said assorted target transmission times and ends at said next upcoming one of said assorted target transmission times.

18. The wireless client device as claimed in claim 17, said processor is further operative:

to sense that said wireless medium is available throughout said sensing interval;

to gain access to said wireless medium for said purpose of transmitting said further uplink packet; and to transmit said further uplink packet in said manner at said next upcoming one of said assorted target transmission times.

19. The wireless client device as claimed in claim 17, wherein said processor is further operative:

to sense that said wireless medium is unavailable for at least part of said sensing interval; and as a result of sensing that said wireless medium is unavailable for at least part of said sensing interval, to initiate said CSMA/CA mechanism in an attempt to gain access to said wireless medium to transmit said further uplink packet.

20. The wireless client device as claimed in claim 14, wherein said further uplink packet comprises a trigger frame belonging to a particular access category and initiates delivery of one or more downlink packets from said access point in a manner receivable by said wireless client device, wherein said one or more downlink packets are categorized as belonging to said particular access category, and wherein said predetermined time is dependent upon said particular access category.

* * * * *